United States Patent [19]

Jäger

[11] 4,183,733
[45] Jan. 15, 1980

[54] HYDRO GAS PLANT WITH UTILIZATION OF THE RESIDUAL COKE

[76] Inventor: Walter Jäger, Schulweg 33, 5250 Engelskirchen, Cologne, Fed. Rep. of Germany

[21] Appl. No.: 879,192

[22] Filed: Feb. 21, 1978

[51] Int. Cl.² .................................................. C10J 3/68
[52] U.S. Cl. .......................................... 48/77; 48/101; 48/210; 165/DIG. 12; 208/8 R
[58] Field of Search ................... 48/77, 76, 62 R, 101, 48/210, 197 R, 202, 206; 110/230; 122/5; 208/8, 10; 165/DIG. 12

[56] References Cited

U.S. PATENT DOCUMENTS

| | | | |
|---|---|---|---|
| 1,023,567 | 4/1912 | Huttinger | 122/5 |
| 3,708,269 | 1/1973 | Linden | 48/197 R |
| 3,779,725 | 12/1973 | Hegarty et al. | 48/202 |
| 3,922,215 | 11/1975 | Linden et al. | 48/197 R |
| 4,039,426 | 8/1977 | Schutte | 208/8 |
| 4,076,612 | 2/1978 | Hollaway | 48/197 R |
| 4,081,351 | 3/1978 | Heinemann | 208/8 |

Primary Examiner—S. Leon Bashore
Assistant Examiner—George C. Yeung

[57] ABSTRACT

A hydro gas plant with utilization of the residual coke, comprising a gasifier into which raw coal is introduced for hydro gasification that results in the production of methane; a furnace for cracking the methane into hydrogen and carbon monoxide; and means for utilizing the combustion heat of the residual coke obtained during the operation of the gasifier, or a low-BTU gas produced from the coke, in at least the cracking furnace but optionally also in a steam generator. The use of exhaust gases from the cracking furnace is also suggested, namely in a preheater through which hydrogen is fed to the gasifier.

9 Claims, 1 Drawing Figure

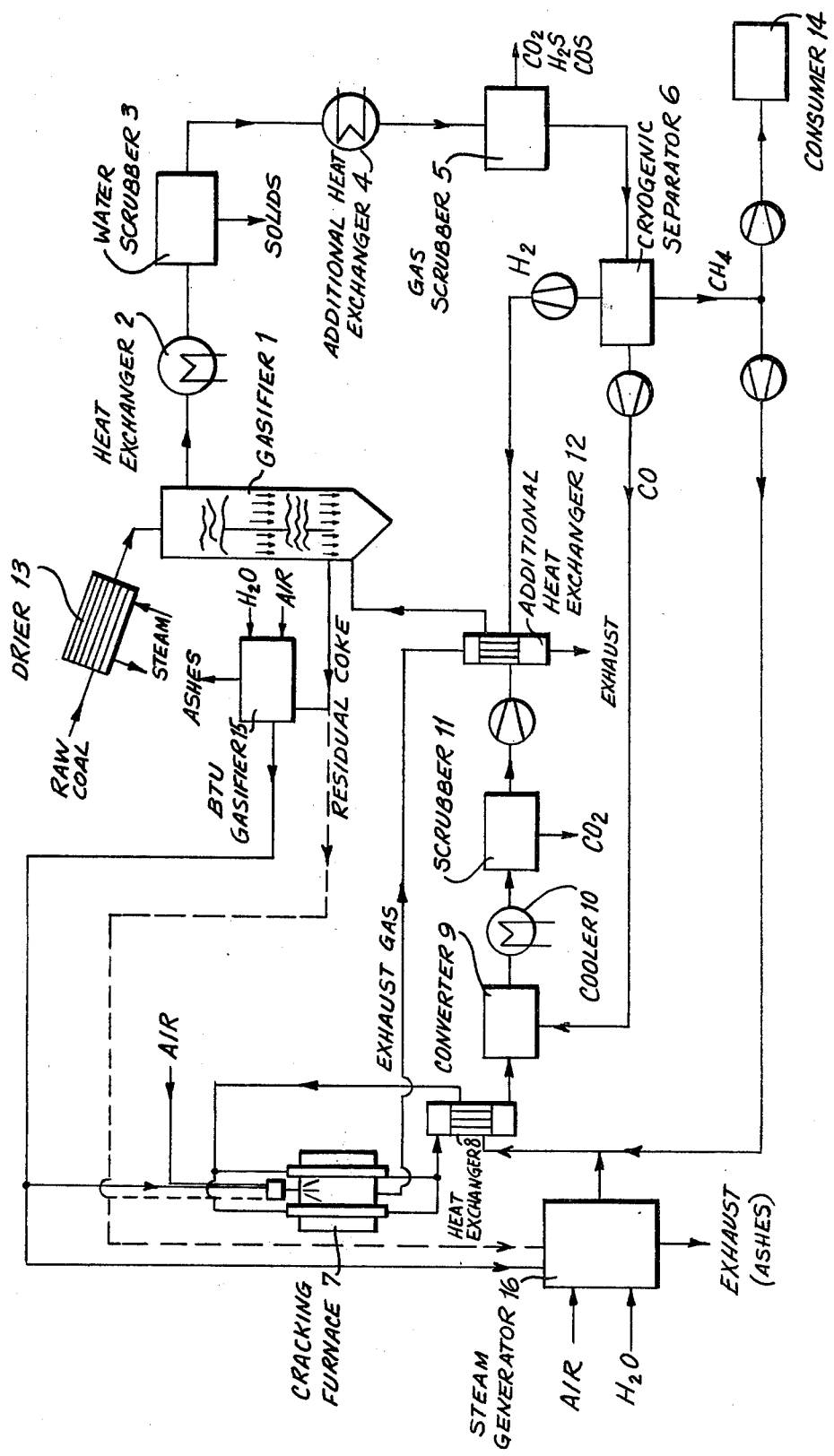

HYDRO GAS PLANT WITH UTILIZATION OF THE RESIDUAL COKE

The present invention pertains to an autothermic plant for hydro gasification of coal, wherein part of the produced methane gas is cracked into hydrogen and carbon monoxide by means of a cracking furnace. During the hydro gasification of coal, whether hard or soft bituminous coal, a certain portion of the processed carbon remains as coke since for complete gasification, the residence time of the coal in the gasifier would be so long that an economical utilization of the plant were made impossible. This residual coke, as well as the gas generated therefrom that contains carbon monoxide, are of relatively poor quality and are, therefore, hard to dispose of.

In the July 12, 1971 issue of "Chemical Engineering", pages 59 to 61, it is suggested to treat the residual coke with steam whereby a hydrogen-rich gas is obtained which in turn can be used as hydration gas for the hydro gasification. By combustion of a portion of the residual coke, the heat required for steam gasification can be obtained. It is, however, much more economical to utilize the residual coke in accordance with the invention in the manner described below.

The object of the invention is an economical and complete usage of the residual coke within an easily controllable plant for hydro gasification of coal while at a stable process behavior.

This is solved by using the combustion heat of the residual coke obtained during gasification to heat the furnace in which the methane is cracked. The hydrogen required for hydro gasification of coal can be produced without any additional energy supply. The produced coke does not require cooling, storing, or outside disposal but is being used continuously within the same plant whereby the heat discernible therein is saved for the process.

In one embodiment of the invention it is suggested that the residual coke is directly used for heating. By comparison to a standard plant, no additional expenditures are required because the residual coke must be hauled away in any case and the cracking furnace must still be heated.

In another embodiment it is suggested that the cracking furnace can be heated with the gas produced from the residual coke by low BTU gasification by addition of steam and air. This is advantageous if the residual coke is of such consistency and composition that it is less suited for combustion such as poor combustion characteristics, or if it contains substances which would attack during burning the heated surfaces of the cracking furnace.

Both embodiments have the characteristic that the cracking furnace is heated by an otherwise available fuel of relatively low quality and that the otherwise used high-quality fuels such as coal or a partial stream of product gas can be saved.

In a further development of the invention it is suggested that the steam generator which supplies a steam required for the cracking furnace is either heated with the residual coke itself or with a low BTU gas produced from the coke, in accordance with the above alternative procedures. At this point in the process where heat must be added one can again forego the use of high-quality fuels.

For the production of a sufficient amount of residual coke for the heating of both the steam generator and the cracking furnace it is naturally necessary to reduce the degree of gasification of the coal introduced into a gasifier from the attainable approx. 70% to approx. 50%. However, this apparent sacrifice has a favorable effect on economy because the gasifier can be made smaller, on account of the shorter residence time of the coal in the gasifier, for the same throughput, by totally utilizing the residual coke within the same plant and through the savings in high-quality fuels.

In a further development of the invention for a plant with a preheater for the hydrogen fed into the gasifier, the suggestion is made that the preheater be heated with the waste gas exiting from the cracking furnace. In doing so, an additional degree of efficiency is achieved by better utilization of the heat value remaining in the combustion gases of the residual coke while at the same time the temperature of the hydrogen fed into the gasifier is increased to a temperature by the highly exothermic process of gasification that is necessary to ensure the performance of the process.

Further objects, features and advantages of the invention will become better understood from the following description when considered in conjunction with the accompanying drawing the sole FIGURE of which is a schematic flow arrangement of an exemplary, preferred embodiment of the inventive hydro gas plant.

The gas plant comprises a gasifier 1 in which, optionally following a drier 13, the raw coal is introduced and undergoes hydro gasification according to the following reaction:

$$C + 2H_2 = CH_4.$$

The methane formed in the gasifier 1 is cooled by a heat exchanger 2 and is cleaned of entrained solid particles by a water scrubber 3. By further cooling with an additional heat exchanger 4, the gas is further scrubbed of undesirable gaseous admixtures such as carbon dioxide, hydrogen sulphide and carbon oxy sulfide in a scrubber 5. By means of a cryogenic separator 6, the remaining gas is separated into its constituents, namely, methane, carbon monoxide and hydrogen. The methane is partially fed to a network and thus to a consumer 14, and partially with addition of steam from a steam generator 16 via a heat exchanger 8 also to a cracking furnace 7.

Here the gas is cracked by addition of heat according to the following reaction:

$$CH_4 + H_2O = 3H_2 + CO$$

and is returned to the other side of the heat exchanger 8, where part of its heat is transferred to the introduced methane-steam mixture. In a converter 9, the carbon monoxide originating from the above reaction as well as the carbon monoxide coming from the cryogenic separator 6 are converted with the addition of steam according to the following reaction:

$$CO + H_2O = H_2 + CO_2.$$

The gas mixture is cooled in a further cooler 10, and in a further scrubber 11 carbon dioxide is removed. Finally, in an additional heat exchanger 12, the hydrogen stream from the preceding reactions and from the cryogenic separator 6 are combined and are reheated by the heat of the waste gas from the cracking furnace 7, and are fed to the gasifier 1 where the hydrogen combined with the methane resumes its circulation.

The residual coke resulting in the gasifier 1 can either be burned directly with air in the cracking furnace 7 or in the steam generator 16 (shown by a dotted line) or can be carbonized with a mixture of atmospheric oxygen and water in a low BTU gasifier 15 according to the following reactions:

$$2C + O_2 = 2CO$$

$$C + 2H_2O = CO_2 + 2H_2$$

$$C + H_2O = CO + H_2.$$

The thus produced heating gas is then used to heat the cracking furnace 7 and/or is burned with air in the steam generator 16. Because of the large volumes of the gas circuits and the numerous branchings, the process of the invention tends to display a stable, controlled system behavior.

I claim:

1. A hydro gas plant with utilization of residual coke, comprising, in combination: a first gasifier (1) into which raw coal is introduced for hydro gasification that results in the production of a gas including methane with residual coke as a byproduct; a cryogenic separator (6) wherein the gas exiting from said first gasifier is further separated into its constituents, namely methane, carbon monoxide and hydrogen; a furnace (7) for cracking the methane originating from said separator into hydrogen and carbon monoxide with exhaust gases as byproducts; a heat exchanger (8) operatively connected with said furnace for passing the methane to and conversely a cracked gas mixture from said furnace in countercurrent fashion; a second gasifier (15) for producing low-BTU gas from at least a portion of the residual coke derived from said first gasifier; a steam generator (16) for adding steam to the methane before being passed from said separator to said furnace through said heat exchanger; and means for utilizing the combustion heat of at least one of the produced residual coke and low-BTU gas by burning in the processes being conducted in at least one of said furnace and said steam generator.

2. The hydro gas plant as defined in claim 1, wherein said heat utilizing means is constituted by a conduit feeding the residual coke from said first gasifier (1) to said cracking furnace (7) for increasing the operating temperature of the latter.

3. The hydro gas plant as defined in claim 1, wherein said heat utilizing means is constituted by a conduit feeding the low-BTU gas from said second gasifier (15) to said cracking furnace (7) for increasing the operating temperature of the latter.

4. The hydro gas plant as defined in claim 1, wherein said heat utilizing means is constituted by a conduit feeding the residual coke from said first gasifier (1) to said steam generator (16) where it increases the temperature of the produced steam that is passed to said cracking furance (7) through said heat exchanger (8).

5. The hydro gas plant as defined in claim 1, wherein said heat utilizing means is constituted by a conduit feeding the low-BTU gas from said second gasifier (15) to said steam generator (16) where it increases the temperature of the produced steam that is passed to said cracking furnace (7) through said heat exchanger (8).

6. The hydro gas plant as defined in claim 1, further comprising a preheater (12) for the hydrogen being fed into said first gasifier (1), fed by at least one of said separator (6) and said cracking furnace (7); and a conduit feeding the exhaust gases from said furnace to said preheater for a better exploitation of the combustion heat produced in the plant.

7. The hydro gas plant as defined in claim 1, further comprising a drier (13) preceding said first gasifier (1) for the introduced raw coal.

8. The hydro gas plant as defined in claim 1, further comprising at least one cooling stage (2, 4, 10) intercalated downstream of at least one of said first gasifier (1) and said cracking furnace (7).

9. The hydro gas plant as defined in claim 1, further comprising a converter (9) downstream of said cracking furnace (7) for combining and converting the carbon monoxide obtained from both said cracking furnace and said cryogenic separator (6).

* * * * *